April 21, 1970     Z. HOFFMANN ET AL     3,507,548
SCREEN FOR RECEIVING PHOTOGRAPHIC IMAGES
Filed Sept. 15, 1967
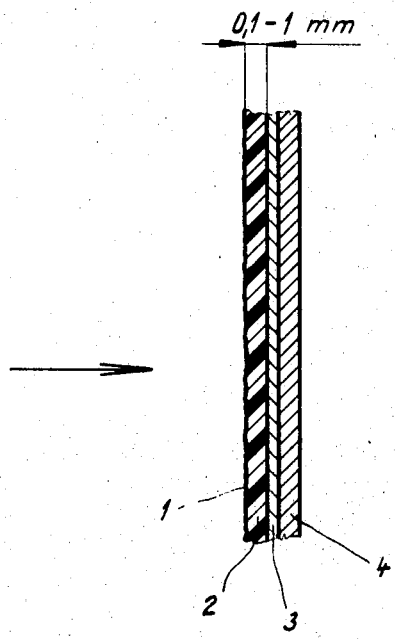
INVENTORS:
Zdenek HOFFMAN
BY Jaroslav PECHAR
their Attorney

United States Patent Office 3,507,548
Patented Apr. 21, 1970

3,507,548
SCREEN FOR RECEIVING PHOTOGRAPHIC IMAGES
Zdenek Hoffmann, Beroun, and Jaroslav Pechar, Prague, Czechoslovakia, assignors to Ceskoslovenska Akademie Ved, Prague, Czechoslovakia, a corporation
Continuation-in-part of application Ser. No. 642,440, May 1, 1967. This application Sept. 15, 1967, Ser. No. 685,991
Claims priority, application Czechoslovakia, Sept. 20, 1966, 6,058/66
Int. Cl. G03b 21/56
U.S. Cl. 350—117　　　　　　　　　　　　9 Claims

ABSTRACT OF THE DISCLOSURE

A screen to be used with a projection apparatus for receiving all kinds of epidiascopic images, blueprints, drawings, color transparencies, etc. The screen is adapted particularly to give good performance under conditions where exterior light would disturb the projection of an image onto a conventional screen. The screen has a front transparent diffusing layer, made of a foil of clear plastic material, and having a front-exposed, matted surface and a rear surface directed away from the latter matted surface. A highly reflective layer is joined to this rear surface of the transparent diffusing layer, this latter rear surface of the transparent diffusing itself being glossy. The thickness of the transparent diffusing layer ranges from 0.1 to 1 mm.

Related applications

The present disclosure is a continuation-in-part of applicants' co-pending application Ser. No. 642,440, now abandoned.

Background of the invention

The invention relates to screens for receiving epidiascopic images.

The screen of this invention is particularly suitable for projection under conditions of disturbing illumination, for example in school rooms or lecture rooms which cannot be sufficiently darkened in day-time.

In particular, the invention relates to a projection screen of a semi-diffusion type, which is capable of projecting either from a still or a motion picture projector images under conditions where there would otherwise be disturbing illumination. For example, in classrooms where there is disturbing daylight penetrating through the windows of the classroom, this daylight is received by the projection screen to greatly detract from the quality of the image which is seen on the screen. Similar conditions are encountered, for example, in lecture halls which have no windows but in which there is either direct or reflected ceiling or wall light which is incident upon the projection screen. Disturbing illumination of these latter types provide an impermissible deterioration of the contrast and quality of the image in the event that this disturbing outside illumination exceeds a value of approximately 5–8% of the illumination emitted by the projector.

As is well known, almost all known projection screens require projection of an image thereon to take place in a darkened room. In the event that the conventional projection screens are used under conditions of disturbing exterior illumination, it is essential to increase to a very large extent the light which is derived from the projector.

Projection of photographic images under conditions of disturbing outside illumination has been possible by using equipment which requires special shielding tubes, tunnels, shafts and the like, in which the projection screens are situated to be viewed by an observer through suitable openings in the tube, tunnel, or the like, Also, there are specially designed pearl projection screens, such as, for example, those known as black pearl retroflecting screens, or metallized screens made, for example, of a plastic material provided with a layer of aluminum coating. Screens of this construction, however, have only a very narrow characteristic of reflection which makes them suitable for use only for a small number of viewers, and in addition the luminous efficiency of these screens is low. The quality of the image seen on the screens is also very poor, in particular in connection with the sharpness of the images.

There are other known projection screens designed for projecting images under conditions of disturbing outside illumination and having a relatively high luminous efficiency which in part enables them to counteract the influence of the disturbing outside light. Such results are achieved, for example, by providing a finely corrugated structure for the front or rear surface of the projection screen, as shown for example, in U.S. Patent 2,660,927. However these screens require a construction which eliminates the influence of disturbing outside illumination only in a few cases, namely those where the incidence angle of the disturbing illumination with respect to a line perpendicular to the screen is very large. In this way the capability of reproducing the details of the image which is projected onto the screen is substantially less than under optimum conditions where, for example, a white diffusing screen is used.

Summary of the invention

It is accordingly a primary object of the present invention to provide a projection screen which eliminates all of the above drawbacks and which will improve to a still further extent the optical properties of the image which can be seen at the screen of the invention.

In particular, it is an object of the present invention to provide a screen of the above type which has a high luminous efficiency, which increases the contrast of the image, and which has a very high capacity to reproduce details of the image, corresponding favorably to the capability of a white diffusing screen to reproduce such details.

In accordance with the invention, the projection screen has a transparent diffusing layer having a front surface directed toward the projector and a rear surface directed away from the projector and joined to a highly reflecting surface. This front transparent diffusing layer of the screen of the invention is formed from a foil of clear plastic material, such as polyvinyl chloride, and has a thickness of 0.1 to 1.0 mm., this foil having its front exposed surface matted so as to be light diffusing while its rear surface is glossy and is joined with the flat surface of a highly reflecting layer of material.

Additional improvements in the projection screen of the invention, particularly in connection with optimum increase of the reflectance characteristics under conditions of incident outside disturbing illumination, are achieved with the structure of the invention by matting the transparent diffusing layer at its front surface so that the integral transmittance in a direction perpendicular to the transparent diffusing layer is within the limits of 45–55%, this layer being matted at its front exposed surface so that when parallel light rays impinge perpendicularly onto the transparent diffusing layer, the intensity of the rays reflected with an angle of 30° or more from a line perpendicular to the screen is within the limits of 70–50% of the intensity of the rays reflected perpendicularly from the layer and has the integral reflectance coefficient $\rho$ of $0.12\pm0.02$.

The screen of the present invention can be constructed in such a way that the highly reflecting layer at the rear surface of the transparent diffusing layer is in the form of a metal foil which is glossy and as highly reflective as a mirror and which is joined, under heat and pressure, for example, to the rear surface of the transparent diffusing layer. For this purpose it is possible to use a suitable adhesive an interlayer of a clear material, such as, for example, a product which is marketed in Czechoslovakia under the trade name Solacryl or similar materials. Solacryl is a thermoplastic acrylate resin with a suitable solvent. The adhesive interlayer of clear transparent material forms after the solvent has evaporated. This latter adhesive interlayer thus is situated at the interface between the transparent diffusing layer and the highly reflecting metal layer situated opposite the rear surface of the transparent diffusing layer. The clear adhesive layer has preferably a thickness of less than 0.05 mm. All of these layers are joined, by pressure and heat, for example, at the rear surface of the metal reflecting layer on a suitable supporting or carrying layer, such as an auxiliary carrying material made of paper, fabric, or a relatively strong foil of plastic. A projection screen according to the present invention made in this way can easily be rolled up and will not be damaged during transport or during use. Of course, it is also possible to provide under conditions of pressure and heat in a suitable vacuum, such as by a known vapor-deposition process, a coating of a metal, such as aluminum, directly on the rear glossy surface of the transparent diffusing layer.

The term "integral reflectance coefficient" refers to a mean reflectance coefficient in all directions and its value must be below 1.0, whereas the directional reflectance coefficient refers to reflectance in a certain direction and can exceed this value.

Brief description of the drawing

The invention is illustrated by way of example in the accompanying drawing which shows one possible example of a screen according to the invention in a fragmentary longitudinal sectional elevation.

Description of a preferred embodiment

Referring now to the drawing, it will be seen that a suitable carrier or base 4 which may be made of any material, opaque or otherwise, such as wood, paper, fabric, plastic, of any suitable thickness, carries the highly reflecting layer 3 which is joined in any suitable way to the carrier layer 4, as by being adhered thereto with a suitable adhesive, under conditions of pressure and heat, for example. This foil 3 may be made of metal, such as aluminum, and its front surface, which is directed toward the left, as viewed in the drawing, the foil 3 is very highly reflecting and glossy, having the same qualities as a mirror. Onto this front, highly reflecting surface of the foil 3 is joined the rear surface of the transparent diffusing layer 2 of the invention which is made of a clear plastic such as polyvinyl chloride and which has a front exposed surface 1 which is very finely matted so as to be light-diffusing. The thickness of the transparent diffusing layer 2 is chosen in such a way that the distance between the front exterior matted surface 1 of the layer 2 and the highly reflecting foil 3 is between 0.1 and 1.0 mm., preferably 0.3 mm., for example. The thickness of the layer 2 should not exceed 1.0 mm. This extremely small thickness does not make it possible to use a rigid, brittle material, such as glass, for the transparent diffusing layer of the screen of the invention. At a thickness of greater than 1.0 mm., the effectiveness of the screen and the quality of the image seen thereon declines undesirably.

The screen according to the invention, as actually constructed with a transparent diffusion layer 2 having a thickness of about 0.3 mm., has in a direction perpendicular to the screen a reflectance $\rho$ up to $\neq 5.5$ for a beam of rays impinging perpendicularly on the screen, this reflectance dropping down to the value of 1.0 for a viewing angle of $\pm 30°$. The acceptable disturbing illumination which this projection screen of the invention achieves for a black and white image projected onto the screen is maximum of 52% of that illumination which is emitted by the projector. Thus, with the screen of the invention it is possible under these conditions to have an outside disturbing illumination of up to 52% of the illumination of the projector itself, while still achieving acceptable images at the screen.

Without further analysis, it will be obvious to those skilled in the art, upon a study of this disclosure, that this invention permits various modifications and alterations without omitting features that, from the standpoint of prior art, fairly constitute essential characteristics of the generic or specific aspects of this invention, and, therefore, such modifications and alterations are intended to be comprehended within the meaning, scope and range of equivalence of the following claims.

What is claimed is:

1. For use in the projection of images, an image-receiving screen comprising a front, transparent diffusing layer having a front exposed surface and a rear surface directed away from said front surface, said transparent, diffusing layer being in the form of a foil of clear plastic material having a thickness of from 0.1 to 1.0 mm., said front surface of said layer being matted so as to be light diffusing and said rear surface thereof being glossy, and a layer of highly reflecting material joined to said transparent diffusing layer at said rear surface thereof.

2. The combination of claim 1 and wherein said transparent diffusing layer is made of polyvinyl chloride.

3. The combination of claim 1 and wherein said transparent diffusing layer has a thickness of preferably 0.3 mm.

4. The combination of claim 1 and wherein the integral transmittance in a direction perpendicular to the transparent diffusing layer is between 45 and 55%, the front matted surface of said layer providing in lighting which extends perpendicularly to said layer an intensity of rays reflected by an angle of 30 or more degrees from the perpendicular to said layer within limits of 70–50% of the intensity of rays reflected perpendicularly from said layer, said layer having an integral reflectance coefficient $\rho$ of $0.12\pm0.02$.

5. The combination of claim 1 and wherein said reflecting layer which is joined to said rear surface of said transparent diffusing layer has a highly reflecting glossy surface directed toward said rear surface of said diffusing layer, and an interlayer of clear adhesive material being situated at the interface between said transparent diffusing layer and said reflecting layer and having a thickness of less than 0.05 mm.

6. The combination of claim 5 and wherein said interlayer consists of thermoplastic acrylate resin.

7. The combination of claim 1 and wherein said reflecting layer is a metal foil.

8. The combination of claim 7 and wherein said metal foil is joined at its surface which is directed away from said transparent diffusing layer to a supporting layer of a material which carries both said metal foil and said transparent layer.

9. The combination of claim 1 and wherein a supporting layer is joined to said reflecting layer at a surface thereof is directed away from said transparent diffusing layer.

References Cited

UNITED STATES PATENTS

| | | |
|---|---|---|
| 2,508,058 | 5/1950 | Bradley. |
| 2,660,927 | 12/1953 | Burton _____ 350—129 |
| 2,928,131 | 3/1960 | Mahler. |
| 2,968,219 | 1/1961 | Saiia _____ 350—117 |
| 3,063,339 | 11/1962 | Mihalakis et al. _____ 350—129 |
| 3,314,742 | 4/1967 | Morgan _____ 350—117 |

JULIA E. COINER, Primary Examiner

U.S. Cl. X.R.

350—125